June 5, 1956

W. HAROLD ET AL 2,748,646

SEPARABLE EYE FOR A BOLT

Filed Sept. 13, 1952

INVENTORS:
WILLIAM HAROLD
WILLIAM BILYK
BY
ATTORNEY.

United States Patent Office 2,748,646
Patented June 5, 1956

2,748,646

SEPARABLE EYE FOR A BOLT

William Harold and William Bilyk, St. Louis, Mo.

Application September 13, 1952, Serial No. 309,428

1 Claim. (Cl. 85—9)

This invention relates to eye-bolts as used for lifting, or hoisting material from place to place by means of a crane, and, more particularly to a separable eye-bolt for attachment to the material.

The present invention has for its main object to provide an eye-bolt wherein the bolt portion of the eye-bolt may be of various diameters and lengths.

A further object of the invention is to provide an eye-bolt which will overcome certain practical objections to, and defects in, eye-bolts now in use for the purpose of lifting material from place to place by means of a crane.

Other objects and advantages of the invention may appear in the following specification describing the invention with reference to the accompanying drawings illustrating the embodiment thereof. It is, however, to be understood that our invention is not to be limited, or restricted to the exact construction and combination of parts described in the specification and shown in the drawing, but that such changes and modifications can be made which fall within the scope of the claim appended hereto.

In the accompanying drawing forming a part of this application, wherein like characters of reference denote similar parts throughout the several views.

Figure 1:
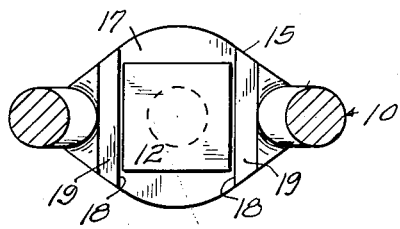
Fig. 1 is a cross-sectional view of the eye-bolt taken on line 1—1 of Fig. 3, looking in the direction of the arrows.
Figure 2:
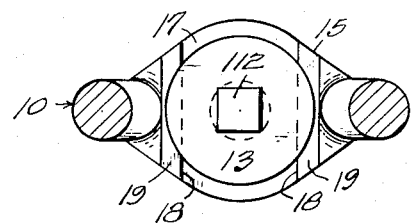
Fig. 2 is a cross-sectional view of the eye-bolt taken on line 2—2 of Fig. 3, and illustrating means for using a small diameter bolt with the yoke having the eye hole.

Referring now, in detail, to the drawing illustrating the embodiment of our invention, the eye-bolt according to the invention embodies an eye, or yoke portion designated, generally, as 10, a bolt 11 having a head 12, and a washer designated 13.

The eye, or yoke portion 10 is, preferably, although not necessarily, a one piece steel forging having an eyehole, or opening 14 and a base portion 15 having a bolt receiving opening 16. The eye, or yoke may be a casting of any suitable material to meet the required strength and the casting, or forging may be either rough, or finished according to order.

The upper end of the base 15 is provided, or formed with an open ended upper facial channel providing a flat horizontal face 17 surrounding the upper end of the bolt opening 16 and two spaced apart parallel vertical channel walls 18 to provide two spaced apart ledges, or shoulders 19 on opposite sides of the channel.

Figure 4:
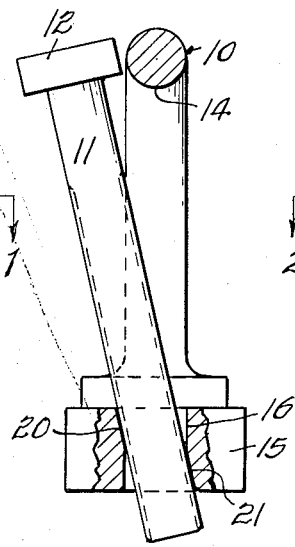
Fig. 4 is a cross-sectional view of the yoke showing a bolt that is longer than the yoke being positioned in the yoke.

As clearly shown in Fig. 4 of the drawings, one-half of the upper half of the bolt receiving opening 16 is beveled, or chamfered, as at 20, and one-half of the lower half of the opening 16, on the opposite side of the opening, is beveled, or chamfered, as at 21, so as to allow the bolt 11 having the head 12 to enter the bolt hole opening 16 and to allow the head 12 to pass the upper end of the yoke 10 when positioning the bolt 11, or removing it from the yoke for any reason.

Figure 3:
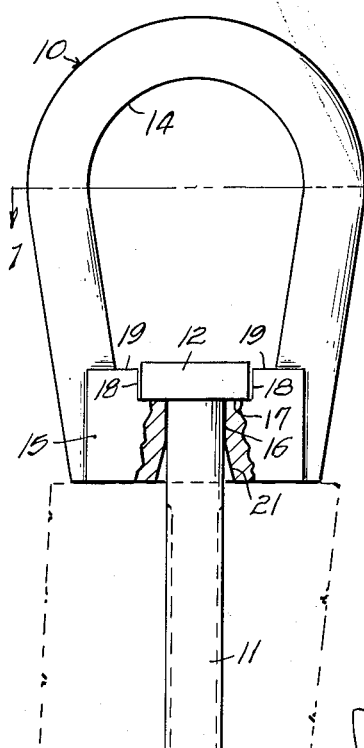
Fig. 3 is a side elevation of the eye-bolt embodying the features of our invention.

As clearly shown in Fig. 3, the square head 12 of the bolt 11 engages the vertical side walls 18 of the upper facial channel in base portion 15 and rests on the horizontal flat surface 17. The side walls 18 prevent the bolt 11 from turning relative to the yoke 10.

Figure 5:
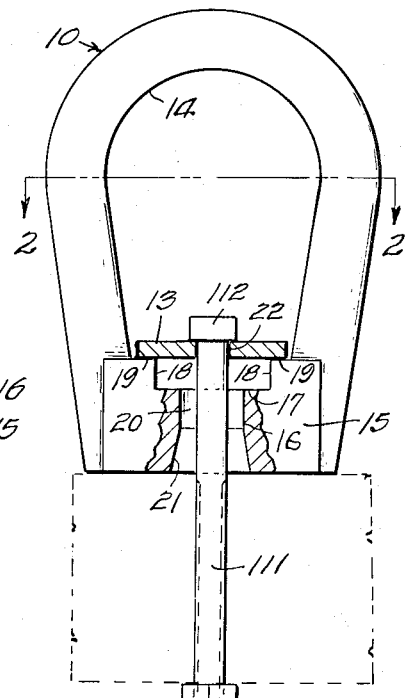
Fig. 5 is a side elevation of the yoke showing a bolt having a head smaller in diameter than the bolt opening and showing a washer resting on opposed shoulders which supports the bolt.

In Fig. 5, a bolt 111 is employed which is smaller in diameter than the bolt opening 16 and even the head 112 thereof is substantially the diameter of the opening 16. In the instant case, and wherein the exact, or correct size of bolt is not handy, the washer 13 may be seated on the ledges, or shoulders 19 above the channel with the bolt passing through an opening 22 in the washer 13 and the opening 16 in the base of the yoke 10. Thus, various diameters of bolts may be used with one size of yoke.

Figure 6:
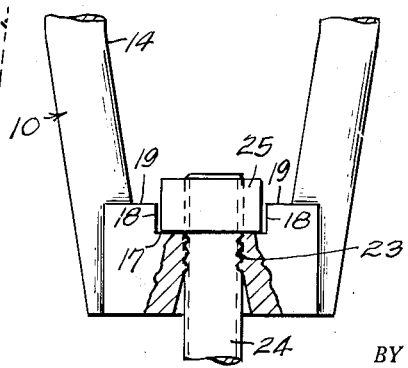
Fig. 6 is a fragmentary cross-sectional view of the yoke provided with a screw-threaded opening to receive a stud instead of a bolt having a head.

In the modification shown in Fig. 6, the opening in the base 15 is shown as screw-threaded and designated 23 to receive one of the screw-threaded ends of a stud 24. A nut 25 may be secured to the upper end of the stud 24 to be seated in the open ended upper facial channel to rest on the surface surrounding the bolt opening 16.

The many advantages of the herein material lifting eye-bolt will readily suggest themselves to those skilled in the art to which it appertains.

It is to be understood that the appended claim is to be accorded a range of equivalents commensurate in scope with the advance made over the prior art.

What we claim is:

A material handling eye-bolt comprising a relatively thick base provided with a vertical bolt receiving bore and a bail-shaped yoke having its ends integral with said base at diametrically opposite sides of said bore, said base having a flat upper surface provided between the ends of said yoke with a bolt head receiving channel extending at right angles to the plane of the yoke and affording a pair of spaced parallel vertical shoulders adapted to engage diametrically opposite sides of a bolt head, the wall of said bore having diametrically opposite portions at the respective upper and lower regions of the bore provided with outwardly inclined surfaces substantially parallel with each other and disposed in a plane at right angles to the axis of said yoke, each of said inclined surfaces spanning substantially half the circumference of the bore and extending substantially half the thickness of said base, whereby to afford clearance for insertion and removal of a bolt in said bore while maintaining the bolt in supportable engagement with the straight wall portions of the bore when the bolt is installed.

References Cited in the file of this patent

UNITED STATES PATENTS

| 805,704 | Baltezor | Nov. 28, 1905 |
| 1,278,622 | Fisher | Sept. 10, 1918 |
| 1,761,978 | Black | June 3, 1930 |

FOREIGN PATENTS

| 101,491 | Great Britain | Sept. 28, 1916 |